(12) United States Patent
Chun et al.

(10) Patent No.: US 8,238,371 B2
(45) Date of Patent: Aug. 7, 2012

(54) METHOD FOR OPERATING ENHANCED RLC ENTITY AND RNC ENTITY FOR WCDMA AND SYSTEM THEREOF

(75) Inventors: Sung-Duck Chun, Gyeonggi-do (KR); Young-Dae Lee, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 801 days.

(21) Appl. No.: 12/278,551

(22) PCT Filed: Feb. 7, 2007

(86) PCT No.: PCT/KR2007/000664
§ 371 (c)(1),
(2), (4) Date: Aug. 6, 2008

(87) PCT Pub. No.: WO2007/091839
PCT Pub. Date: Aug. 16, 2007

(65) Prior Publication Data
US 2009/0036061 A1    Feb. 5, 2009

Related U.S. Application Data

(60) Provisional application No. 60/771,305, filed on Feb. 7, 2006.

(30) Foreign Application Priority Data

Jan. 10, 2007    (KR) .................. 10-2007-0002721

(51) Int. Cl.
*H04J 3/24*       (2006.01)
*H04W 40/00*      (2009.01)

(52) U.S. Cl. .................................... 370/474; 455/450
(58) Field of Classification Search .................. None
See application file for complete search history.

(56) References Cited

U.S. PATENT DOCUMENTS

| 6,138,158 A  | 10/2000 | Boyle et al. |
| 6,317,430 B1 | 11/2001 | Knisely et al. |
| 6,381,229 B1 | 4/2002  | Narvinger et al. |
| 6,480,525 B1 | 11/2002 | Parsa et al. |
| 6,571,102 B1 | 5/2003  | Hogberg et al. |

(Continued)

FOREIGN PATENT DOCUMENTS

CN          1411668      4/2003

(Continued)

OTHER PUBLICATIONS

M. Haardt et al., "The TD-CDMA Based UTRA TDD Mode," IEEE Journal on Selected Areas in Communications, vol. 18, No. 8, pp. 1375-1385, Aug. 2000.

(Continued)

*Primary Examiner* — Hassan Phillips
*Assistant Examiner* — Eunsook Choi
(74) *Attorney, Agent, or Firm* — Lee, Hong, Degerman, Kang & Waimey

(57) ABSTRACT

A method for operating an RLC entity and a MAC entity in a Universal Mobile Telecommunications System (UMTS), the European IMT-2000 system. A format of a MAC-hs PDU is optimized in a MAC-hs entity, so that a large number of users can be supported with using less resources when a VoIP service is provided in one cell.

11 Claims, 5 Drawing Sheets

U.S. PATENT DOCUMENTS

| | | |
|---|---|---|
| 6,597,668 B1 | 7/2003 | Schafer et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 * | 9/2004 | Hwang et al. ................. 370/342 |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,729,719 B2 | 6/2010 | Bergstrom et al. |
| 7,826,859 B2 | 11/2010 | Lee et al. |
| 7,848,308 B2 | 12/2010 | Lee et al. |
| 7,881,724 B2 | 2/2011 | Park et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 2001/0024956 A1 | 9/2001 | You |
| 2001/0046864 A1 | 11/2001 | Bhatoolaul et al. |
| 2002/0009129 A1 | 1/2002 | Choi et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang |
| 2002/0071480 A1 | 6/2002 | Marjelund et al. |
| 2002/0090004 A1 | 7/2002 | Rinchiuso |
| 2002/0093940 A1 | 7/2002 | Toskala |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim |
| 2002/0187789 A1 | 12/2002 | Diachina |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0103476 A1 | 6/2003 | Choi et al. |
| 2003/0131124 A1 * | 7/2003 | Yi et al. ......................... 709/236 |
| 2003/0137931 A1 | 7/2003 | Hans et al. |
| 2003/0139170 A1 | 7/2003 | Heo |
| 2003/0147371 A1 | 8/2003 | Choi |
| 2003/0210669 A1 | 11/2003 | Vayanos et al. |
| 2003/0223393 A1 | 12/2003 | Lee |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0180675 A1 | 9/2004 | Choi et al. |
| 2004/0184437 A1 | 9/2004 | Lee et al. |
| 2004/0185860 A1 | 9/2004 | Marjelund |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0039101 A1 | 2/2005 | Torsner |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0157696 A1 | 7/2005 | Yamamoto et al. |
| 2005/0185608 A1 * | 8/2005 | Lee et al. ...................... 370/328 |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0249222 A1 * | 11/2005 | van Kampen et al. ..... 370/395.5 |
| 2005/0250500 A1 | 11/2005 | Xu |
| 2005/0260997 A1 | 11/2005 | Korale |
| 2005/0265301 A1 | 12/2005 | Heo et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0007886 A1 | 1/2006 | Lee et al. |
| 2006/0025079 A1 | 2/2006 | Sutskover et al. |
| 2006/0030342 A1 | 2/2006 | Hwang et al. |
| 2006/0045047 A1 | 3/2006 | Choi et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0083183 A1 | 4/2006 | Teague et al. |
| 2006/0088009 A1 | 4/2006 | Gibbs et al. |

| | | | | | | |
|---|---|---|---|---|---|---|
| 2006/0120403 | A1 | 6/2006 | Murata et al. | JP | 2003-174470 | 6/2003 |
| 2006/0143300 | A1 | 6/2006 | See et al. | JP | 2003-333661 | 11/2003 |
| 2006/0146745 | A1 | 7/2006 | Cai et al. | JP | 2004-128967 | 4/2004 |
| 2006/0153232 | A1* | 7/2006 | Shvodian ............... 370/468 | JP | 2004-312771 | 11/2004 |
| 2006/0154680 | A1 | 7/2006 | Kroth et al. | JP | 2004-349884 | 12/2004 |
| 2006/0168343 | A1 | 7/2006 | Ma et al. | JP | 2005-500761 | 1/2005 |
| 2006/0193282 | A1 | 8/2006 | Ikawa et al. | JP | 2005510950 | 4/2005 |
| 2006/0256818 | A1 | 11/2006 | Shvodian et al. | JP | 2005-517369 | 6/2005 |
| 2006/0292982 | A1 | 12/2006 | Ye et al. | JP | 2005522923 | 7/2005 |
| 2007/0071025 | A1 | 3/2007 | Bergstrom et al. | JP | 2005-217743 | 8/2005 |
| 2007/0081483 | A1 | 4/2007 | Jang et al. | JP | 2005525720 | 8/2005 |
| 2007/0081513 | A1 | 4/2007 | Torsner | JP | 2005-236988 | 9/2005 |
| 2007/0098006 | A1 | 5/2007 | Parry et al. | JP | 2005-237013 | 9/2005 |
| 2007/0099619 | A1 | 5/2007 | Parekh et al. | JP | 2005-244958 | 9/2005 |
| 2007/0104151 | A1 | 5/2007 | Papasakellariou et al. | JP | 2005-278167 | 10/2005 |
| 2007/0117579 | A1 | 5/2007 | Cai et al. | JP | 2005-536168 | 11/2005 |
| 2007/0135080 | A1 | 6/2007 | Islam et al. | JP | 2005-539462 | 12/2005 |
| 2007/0140115 | A1 | 6/2007 | Bienas et al. | JP | 2006-014372 | 1/2006 |
| 2007/0147326 | A1 | 6/2007 | Chen | JP | 2006-020044 | 1/2006 |
| 2007/0206531 | A1 | 9/2007 | Pajukoski et al. | JP | 2006-025437 | 1/2006 |
| 2007/0218930 | A1 | 9/2007 | Kuo | JP | 2006-505998 | 2/2006 |
| 2007/0254662 | A1 | 11/2007 | Khan et al. | JP | 2006-352705 | 12/2006 |
| 2007/0274253 | A1 | 11/2007 | Zhang et al. | JP | 2007536790 | 12/2007 |
| 2008/0031253 | A1* | 2/2008 | Kim et al. ............... 370/393 | JP | 2009-284532 | 12/2009 |
| 2008/0069031 | A1 | 3/2008 | Zhang et al. | KR | 10-2001-0111634 | 12/2001 |
| 2008/0095105 | A1 | 4/2008 | Sundberg et al. | KR | 10-2001-0111637 | 12/2001 |
| 2008/0130643 | A1 | 6/2008 | Jain et al. | KR | 10-2004-0048675 | 6/2004 |
| 2008/0137564 | A1 | 6/2008 | Herrmann | KR | 10-2004-0064867 | 7/2004 |
| 2008/0212541 | A1 | 9/2008 | Vayanos et al. | KR | 10-2004-0089937 | 10/2004 |
| 2008/0232291 | A1 | 9/2008 | Hus et al. | RU | 2168278 | 5/2001 |
| 2008/0267136 | A1 | 10/2008 | Baker et al. | RU | 2191479 | 10/2002 |
| 2009/0175241 | A1 | 7/2009 | Ohta et al. | RU | 2232469 | 7/2004 |
| 2009/0185477 | A1 | 7/2009 | Lee et al. | RU | 2232477 | 7/2004 |
| 2009/0319850 | A1 | 12/2009 | Baek et al. | RU | 2237380 | 9/2004 |
| 2009/0323624 | A1 | 12/2009 | Kim | RU | 2263415 | 10/2005 |
| 2009/0323646 | A1 | 12/2009 | Ketchum et al. | RU | 2270526 | 2/2006 |
| 2010/0014430 | A1 | 1/2010 | Oka et al. | RU | 2009106289 | 8/2010 |
| 2010/0034095 | A1 | 2/2010 | Ho et al. | TW | 407407 | 10/2000 |
| 2010/0103899 | A1* | 4/2010 | Kwak et al. ............... 370/329 | TW | 548916 | 8/2003 |
| 2010/0105334 | A1 | 4/2010 | Terry et al. | TW | 552815 | 9/2003 |
| 2010/0226263 | A1 | 9/2010 | Chun et al. | TW | 586283 | 5/2004 |
| 2011/0038376 | A1 | 2/2011 | Wiemann et al. | TW | 589818 | 6/2004 |
| | | | | TW | 592412 | 6/2004 |
| | FOREIGN PATENT DOCUMENTS | | | TW | I228008 | 2/2005 |
| CN | 1649285 | 8/2005 | | TW | I229268 | 3/2005 |
| CN | 1658545 | 8/2005 | | TW | 200522579 | 7/2005 |
| CN | 1663158 | 8/2005 | | TW | I237478 | 8/2005 |
| CN | 1692661 | 11/2005 | | TW | I242951 | 11/2005 |
| EP | 0978958 | 2/2000 | | TW | I253824 | 4/2006 |
| EP | 1009184 | 6/2000 | | TW | 280755 | 5/2007 |
| EP | 1261222 | 11/2002 | | WO | 9960729 | 11/1999 |
| EP | 1392074 | 2/2004 | | WO | 99/63713 | 12/1999 |
| EP | 1441473 | 7/2004 | | WO | 02/39697 | 5/2002 |
| EP | 1478203 | 11/2004 | | WO | 02/39760 | 5/2002 |
| EP | 1557968 | 7/2005 | | WO | 02/43403 | 5/2002 |
| EP | 1599063 | 11/2005 | | WO | 02/47417 | 6/2002 |
| EP | 1605724 | 12/2005 | | WO | 02075442 | 9/2002 |
| EP | 1684538 | 1/2006 | | WO | 02/102110 | 12/2002 |
| JP | 06-013959 | 1/1994 | | WO | 03/007636 | 1/2003 |
| JP | 06-121001 | 4/1994 | | WO | 03/017691 | 2/2003 |
| JP | 09-055693 | 2/1997 | | WO | 03/043259 | 5/2003 |
| JP | 09-186704 | 7/1997 | | WO | 03/047155 | 6/2003 |
| JP | 09-327072 | 12/1997 | | WO | 03/056723 | 7/2003 |
| JP | 11-308671 | 11/1999 | | WO | 03/096571 | 11/2003 |
| JP | 11-331949 | 11/1999 | | WO | 2004/030393 | 4/2004 |
| JP | 2000-032088 | 1/2000 | | WO | 2004/034656 | 4/2004 |
| JP | 2000-175271 | 6/2000 | | WO | 2004/045234 | 5/2004 |
| JP | 2000-184428 | 6/2000 | | WO | 2004/089030 | 10/2004 |
| JP | 2001-095031 | 4/2001 | | WO | 2004/091130 | 10/2004 |
| JP | 2001522557 | 11/2001 | | WO | 20041091130 | 10/2004 |
| JP | 2002501695 | 1/2002 | | WO | 2005/006660 | 1/2005 |
| JP | 2002064589 | 2/2002 | | WO | 2005/018269 | 2/2005 |
| JP | 2002-135231 | 5/2002 | | WO | 2005/034418 | 4/2005 |
| JP | 2002-374321 | 12/2002 | | WO | 2005/036917 | 4/2005 |
| JP | 2003-008635 | 1/2003 | | WO | 2005l034418 | 4/2005 |
| JP | 2003504942 | 2/2003 | | WO | 2005/055472 | 6/2005 |
| JP | 2003504968 | 2/2003 | | WO | 2005/071887 | 8/2005 |
| JP | 2003078480 | 3/2003 | | WO | 2005/074312 | 8/2005 |
| JP | 2003-116172 | 4/2003 | | WO | 2005/088886 | 9/2005 |

| | | |
|---|---|---|
| WO | 2005099125 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005/125125 | 12/2005 |
| WO | 2006/011953 | 2/2006 |
| WO | 2006/012946 | 2/2006 |
| WO | 20061012946 | 2/2006 |
| WO | 2007/095966 | 8/2007 |
| WO | 2007091831 | 8/2007 |
| WO | 20071095966 | 8/2007 |

OTHER PUBLICATIONS

Sarkar, S., et al., "Common-Channel Soft Handoff in CDMA2000," IEEE Transactions on Microwave Theory and Techniques, Jun. 2000, pp. 938-950, vol. 48, Issue 6.

NTT Docomo, et al., "Multiplexing Method of Shared Control Channel in Uplink Single-Carrier FDMA Radio Access," 3GPP TSG-RAN WG1, R1-051143, Oct. 10, 2005.

Huawei, "Further Considerations on Multiplexing Method of Shared Control Channel in Uplink Single-Carrier FDMA," 3GPP TSG-RAN WG1, R1-051430, Nov. 7, 2005.

Philips, "Evolved Paging Indicators for LTE," 3GPP TSG-RAN WG2, R2-052985, Nov. 7, 2005.

NTT Docomo, et al., "Paging Channel Structure for E-UTRA Downlink," 3GPP TSG-RAN WG1, R1-060034, Jan. 23, 2006.

LG Electronics Inc., "HARQ and ARQ Operation," 3GPP TSG-RAN WG2, R2-060106, Jan. 9, 2006.

LG Electronics Inc., "Framing in the MAC Entity," 3GPP TSG-RAN WG2, R2-061012, Mar. 27, 2006.

Motorola, "Paging Channel Design for E-UTRA," 3GPP TSG-RAN WG1, R1-061712, Jun. 27, 2006.

Siemens, "States in E-UTRAN," R2-052051, 3GPP TSG-RAN WG RAN2#48, Aug. 2005.

China Mobile Communications Co., "RRC States Analysis in LTE," R2-052140, 3GPP TSG RAN WG2 #48, Aug. 2005.

Qualcomm Europe, "Signaling optimization for E-UTRAN," R2-052407, 3GPP TSG-RAN WG 2 meeting #48-bis, Oct. 2005.

Panasonic, "E-UTRA Transport and Logical Channels," R2-052860, 3GPP TSG RAN WG2#49, Nov. 2005.

Xu, H., et al.; "Performance Analysis on the Radio Link Control Protocol of UMTS System"; 2002 IEEE 56th Vehicular Technology Conference Proceedings; pp. 2026-2030; Sep. 2002.

Qualcomm, "Need for MAC-hs segmentation mechanism," R2-020769, 3GPP TSG-RAN WG2 meeting #28, Apr. 2002.

Motorola et al., "MAC-e/es header and functional split," R2-042360, 3GPP TSG RAN WG2 Meeting#45, Nov. 2004.

Ericsson, "User plane protocol enhancements," R2-052749, TSG-RAN WG2 Meeting #48bis, Oct. 2005.

LG Electronics Inc., "MAC Enhancement," R2-060561, 3GPP TSG-RAN WG2 #51, Feb. 2006.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.

LG Electronics Inc., "UE State Transition in LTE_ACTIVE," R2-061002, 3GPP TSG-RAN WG2 #52, Mar. 2006.

Ericsson, "E-UTRA Random Access"; TSG-RAN WG1 #43; Seoul, Korea; Nov. 2005; R1-051445.

Ericsson, "Solution for sending NAS together with RRC connection request," R2-071817, 3GPP TSG-RAN WG2#58, May 2007.

LG Electronics Inc., "Default SRB for initial access," R2-061958, 3GPP TSG-RAN WG2 LTE Ad-hoc, Jun. 2006.

3rd Generation Partnership Project (3GPP), "Technical Specification Group Radio Access Network; Introduction of the Multimedia Broadcast Multicast Service(MBMS) in the Radio Access Network (RAN); Stage 2 (Release 6)", 3GPP TS 25.346 V6.7.0, Dec. 2005.

* cited by examiner

[Fig. 1] --PRIOR ART--
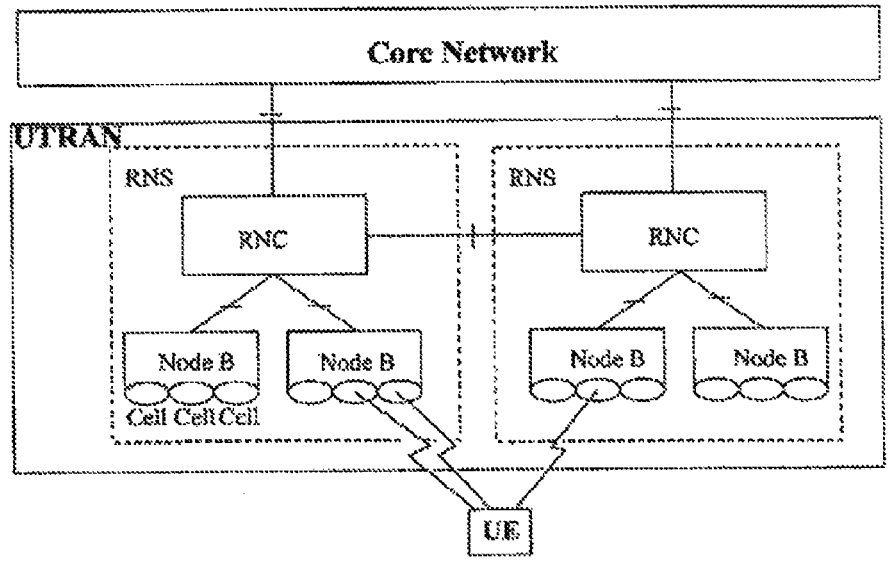
[Fig. 2] --PRIOR ART--
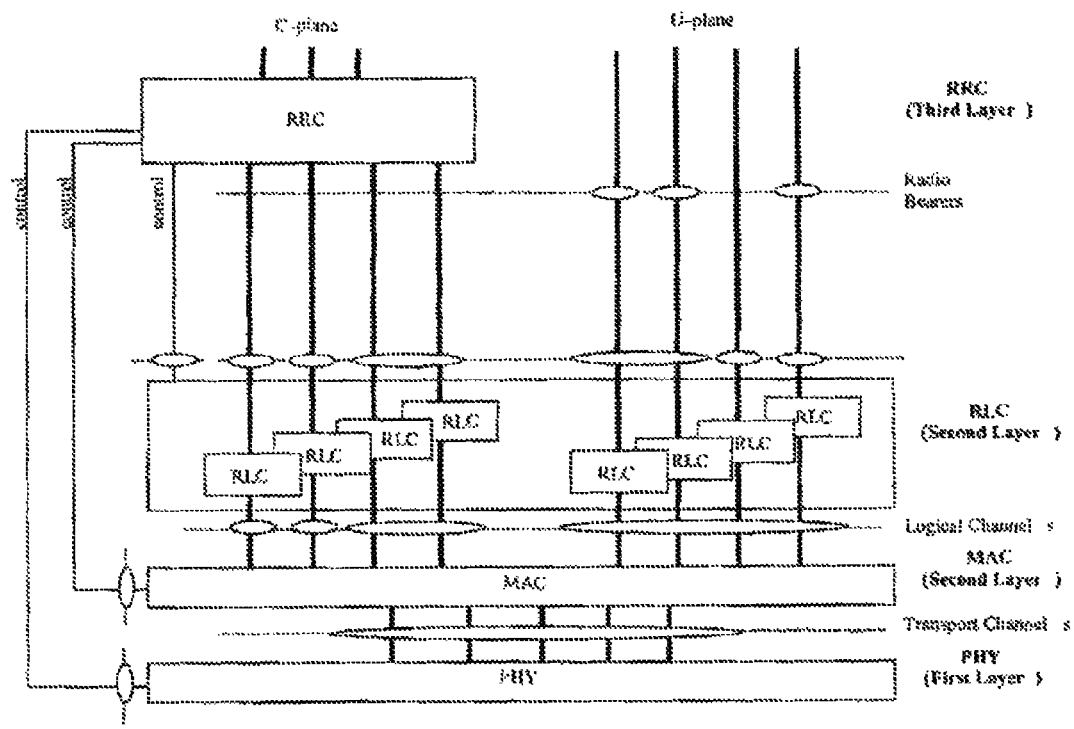

[Fig. 3]
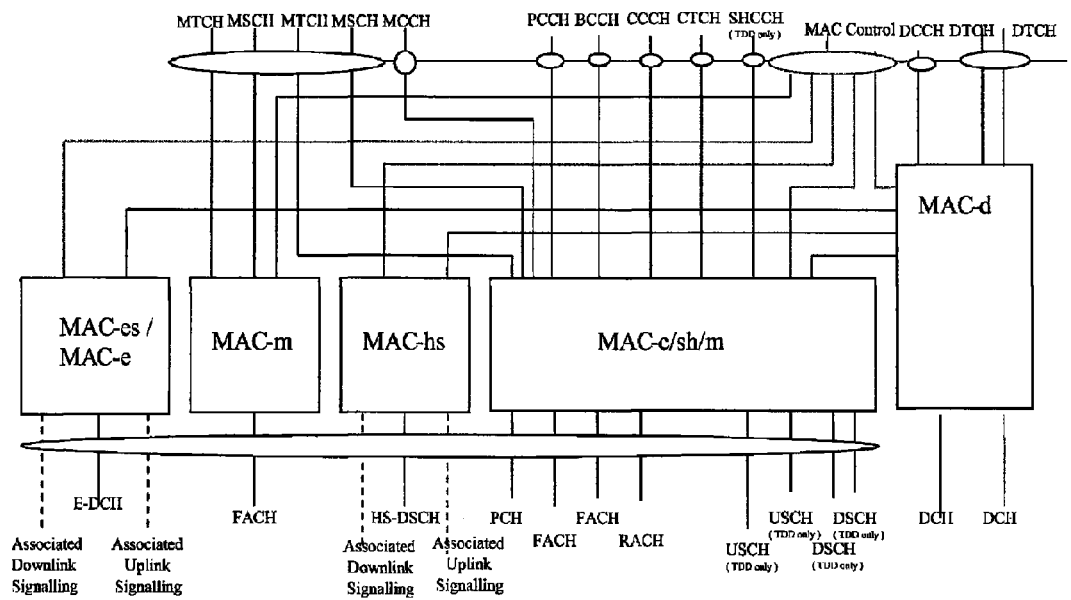
[Fig. 4]
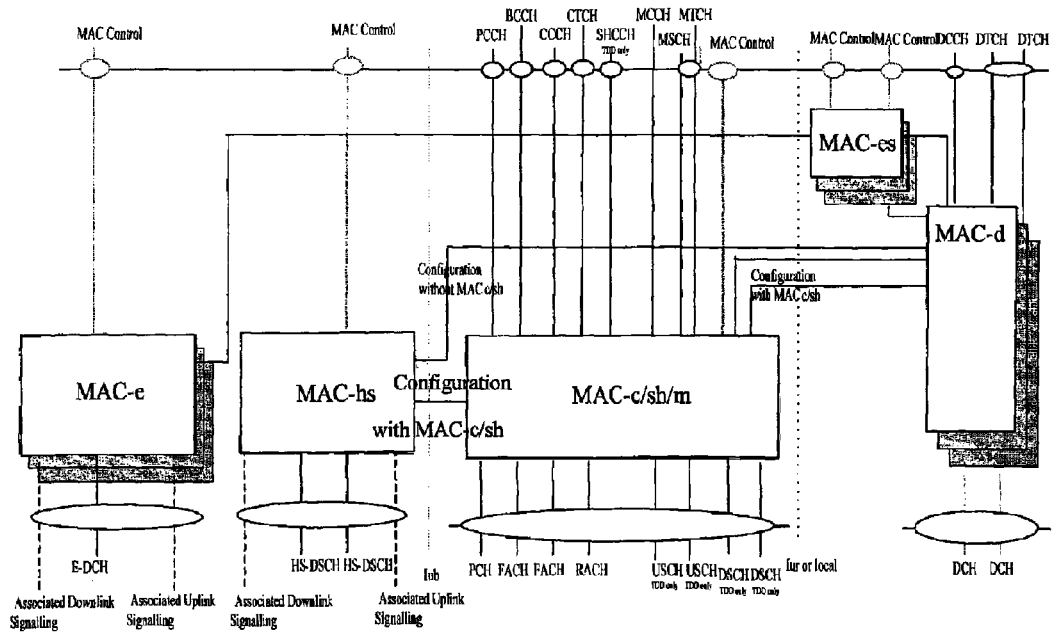

[Fig. 5]
| D/C | Sequence Number | | | Oct 1 |
|---|---|---|---|---|
| Sequence Number | | P | HE | Oct 2 |
| Length Indicator | | | E | Oct 3 (Optional)  (1) |
| Length Indicator | E |
|---|---|
| Data | |
| PAD   or a piggybacked STATUS PDU | |
OctN
[Fig. 6]
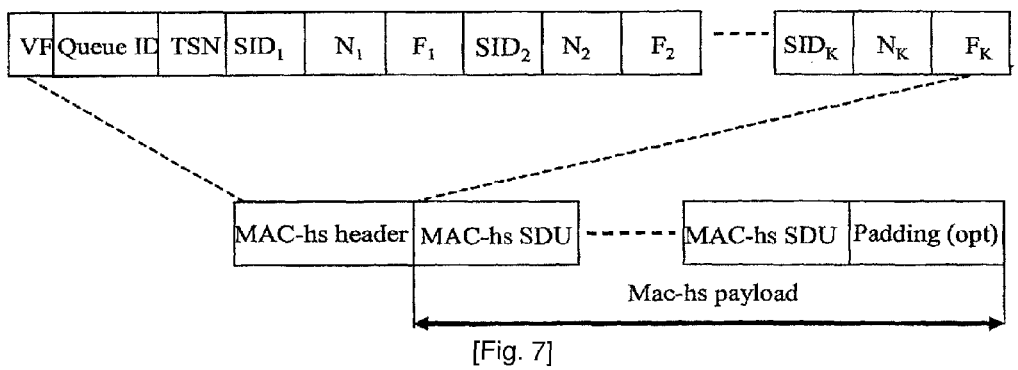
[Fig. 7]
| C/T | MAC SDU |
|---|---|
[Fig. 8]
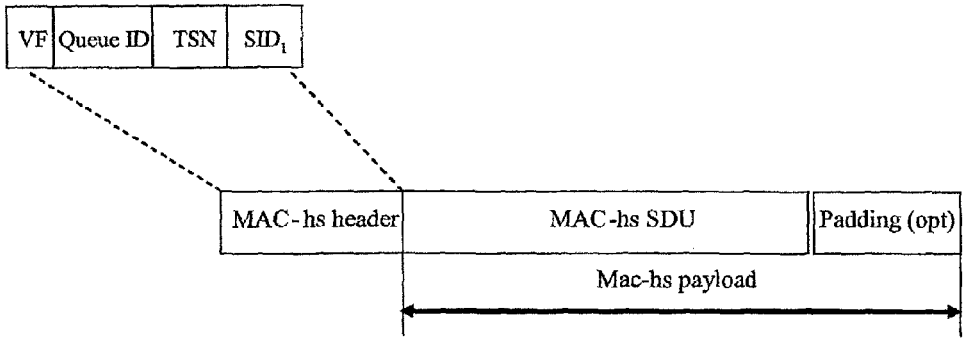

[Fig. 9]
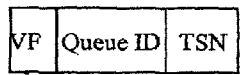
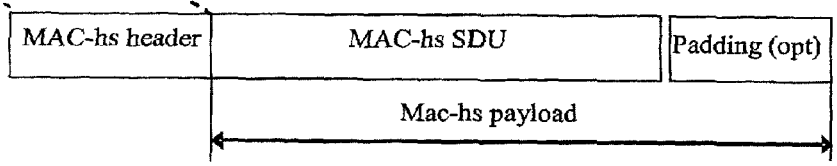
[Fig. 10]
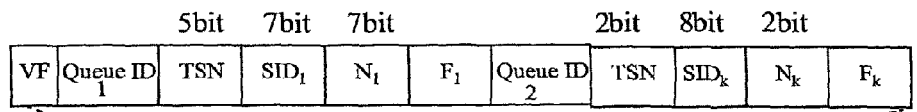
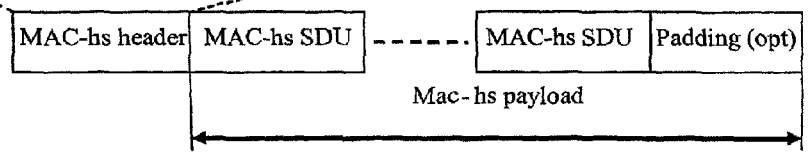
[Fig. 11]
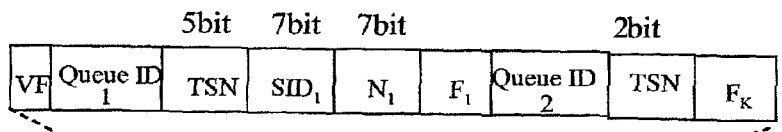
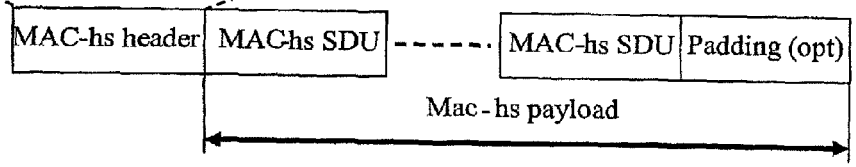

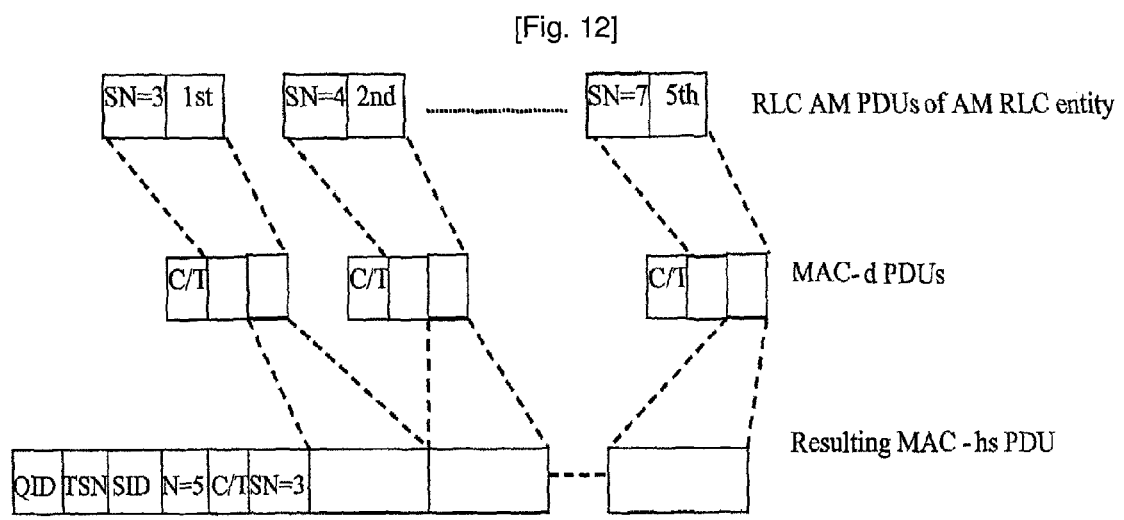
[Fig. 12]

METHOD FOR OPERATING ENHANCED RLC ENTITY AND RNC ENTITY FOR WCDMA AND SYSTEM THEREOF

CROSS-REFERENCE TO RELATED APPLICATIONS

This application is a 371 U.S. national stage application of International Application No. PCT/KR/2007/000664, filed on Feb. 7, 2007, which claims the benefit of earlier filing date and right of priority to Korean Patent Application No. 10-2007-0002721, filed on Jan. 10, 2007 and also claims the benefit of U.S. Provisional Application Ser. No. 60/771,305, filed on Feb. 7, 2006.

DISCLOSURE OF INVENTION

Technical Solution

This disclosure relates to a mobile communications system, and more particularly, to a method for operating enhanced RLC/MAC entity for WCDMA and a system thereof.

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

The most frequently used service in a mobile communications system is a voice call service, and this voice call service can be differentiated from other services, e.g., an Internet browsing service.

In the voice call service, a data packet is generated in a specific time period (e.g., 20 ms when a user speaks and 160 ms when the user does not speak). The number of the data packets generated in each time period is usually one. That means that the number of the data packets for a voice call in one time period is equal to one. Also, in a related art, the size of the data packet in the voice call service is limited to a specific size. And, the specific number of the data packet is set to nine based on a voice codec AMR being currently used in a WCDMA.

Considering the characteristic of the voice call service, the currently used MAC-hs PDU (Protocol Data unit) has an inefficient structure. For instance, a general MAC-hs PDU has a header of 21 bits, whereas a data packet for a voice call has a header of 100 bits. That is, in the voice call service, the header has an overhead of 20% due to a format of the MAC-hs PDU. As the result, a radio resource is wasted, and the number of users who can perform a voice call in one cell can be decreased by 20%.

Also, in the related art, a AM (Acknowledged Mode) RLC entities always transmit a data block of the same (fixed) size to a lower layer regardless of a size of a data block received from an upper layer. That is, even if RLC SDUs (Service data units) transmitted to an RLC entity from an upper layer have different sizes from each other, RLC PDUs transmitted to a lower entity, a receiving RLC entity have the same size. Herein, the size of the RLC PDUs may be set at the time of initially setting a call, or during the call setting through an RRC signaling.

The reason why the RLC PDUs used in the conventional AM RLC entities have the same size is due to a characteristic of the conventional physical channel. In the related art, a logical channel allocated to each RLC entity was mapped onto a transport channel. When data is simultaneously transmitted from several transmission channels to a physical layer, data blocks have to have the same size.

In the related art, a memory that can be used by the mobile terminal is limited. For instance, if each RLC PDU has an identified size and a memory of a receiving side of the mobile terminal is set, a transmitting side RLC can calculate the maximum number of RLC PDUs that can be transmitted without receiving an acknowledgement from a receiving side RLC entity. Accordingly, the transmitting side RLC entity can transmit RLC PDUs having the maximum number before receiving an acknowledgement from the receiving side. In order for the transmitting side to control its data transmission, a calculation of memories that are not used in the receiving side is necessary. For the calculation, the AM RLC is set to use only one size of the RLD PDUs In the related art, a Node-B and an RNC are disposed at different physical layers. That is, an RLC is positioned at the RNC, and a physical layer is positioned at the Node-B. Accordingly, the RNC can not check a situation occurring at the Node-B, and thus the RLC of the RNC has to configure the RLC PDU based on the size of the MAC PDU that can be transmitted even in the worst situation by the Node-B.

Therefore, an object of this disclosure is to provide a method for optimizing a format of a MAC-hs PDU capable of effectively using radio resources and supporting a large number of users.

To achieve these and other advantages and in accordance with the purpose of this disclosure, as embodied and broadly described herein, there is provided a method for operating an entity for a mobile communications system, comprising: optimizing a format of a first data unit by a first entity; and generating a second data unit having one or more sizes based on the optimized first data unit by a second entity.

According to another aspect of this disclosure, there is provided a method for operating an RLC/MAC entity for a mobile communications system, comprising: generating one or more RLC PDUs in a specific time period by an RLC entity; and transmitting the generated RLC PDU to a lower layer.

In order for the RLC entity and the MAC entity to optimize radio resources allocated thereto, the generating one or more RLC PDUs comprises: calculating a maximum data amount to be transmitted by the RLC entity and the MAC entity based on the allocated resources; and calculating a maximum size of an RLC PDU that can be transmitted by the RLC entity and the MAC entity.

To achieve these and other advantages and in accordance with the purpose of this disclosure, as embodied and broadly described herein, there is also provided a mobile communications system, comprising: one or more RLC entities for generating and using RLC PDUs having one or more different sizes; and a MAC entity for receiving the generated RLC PDUs from the RLC entity through one specific logical channel, and including the received RLC PDU to one MAC-hs PDU or one MAC-e PDU.

The foregoing and other objects, features, aspects and advantages of this disclosure will become more apparent from the following detailed description of this disclosure when taken in conjunction with the accompanying drawings.

The accompanying drawings, which are included to provide a further understanding of this disclosure and are incorporated in and constitute a part of this specification, illustrate embodiments of this disclosure and together with the description serve to explain the principles of this disclosure.

In the drawings:

FIG. 1 is an exemplary network structure showing a Universal Mobile Telecommunications System (UMTS);

FIG. 2 shows an exemplary structure of a radio protocol used in the UMTS;

FIG. 3 shows an exemplary structure of an UE side MAC sub-layer architecture;

FIG. 4 shows an exemplary structure of a UTRAN side MAC sub-layer architecture;

FIG. 5 shows an exemplary structure of an AM RLC PDU, a data PDU used when transmitting data;

FIG. 6 shows an exemplary structure of a MAC-hs PDU;

FIG. 7 shows an exemplary structure of a MAC-hs SDU;

FIG. 8 shows an exemplary structure a MAC-hs PDU according to one embodiment of this disclosure;

FIG. 9 shows an exemplary structure a MAC-hs PDU according to another embodiment of this disclosure;

FIG. 10 shows an exemplary structure a MAC-hs PDU according to another embodiment of this disclosure;

FIG. 11 shows an exemplary structure of a MAC-hs PDU where an SID field and an N field of the MAC-hs PDU of FIG. 10 are not used; and FIG. 12 shows an exemplary structure of a MAC-hs PDU having compressed sequence numbers.

Reference will now be made in detail to the preferred embodiments of this disclosure, examples of which are illustrated in the accompanying drawings.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

This disclosure relates to a method for operating a Radio Link Control (RLC) entity and a Medium Access Control (MAC) entity in a Universal Mobile Telecommunications System (UMTS), the European IMT-2000 system. A format of a MAC-has PDU may be optimized in a MAC-hs entity, so that a large number of users can be supported with using less resources when a VoIP (Voice of Internet Protocol) service is provided in one cell.

This disclosure may be applied to the $3^{rd}$ generation partnership project (3GPP) standard, especially, to the European IMT-2000 system, a Universal Mobile Telecommunications System (UMTS). However, this disclosure may be also applied to another communications system.

This disclosure may propose to optimize a configuration (formation) of a MAC-hs PDU capable of effectively using radio resources and supporting a large number of users.

This disclosure may propose to allocate a service such as VoIP to a specific queue. That is, a specific queue may be used only for a service such as VoIP. By allocating the specific queue to the VoIP service, a structure of a MAC-hs PDU relating to the specific queue may be optimized. When a call is to be set between a base station and a mobile terminal, the base station may request to inform the mobile terminal that a specific queue for a specific service is used. The base station may inform the mobile terminal which queue for a specific bearer can be used. Furthermore, the base station may transmit to the mobile terminal information indicating onto which queue each bearer is mapped.

In this disclosure, the base station may request the mobile terminal to inform which MAC-hs PDU format is used for a specific service. Furthermore, the base station may request the mobile terminal of information indicating that a specific queue uses which MAC-hs PDU format. When receiving a MAC-hs PDU corresponding to a specific queue, the mobile terminal may re-arrange (re-assemble, re-configure) the received data block by using the preset (predetermined, pre-defined) MAC-hs PDU format.

This disclosure may propose to set an SID (Size index identifier) field according to each queue so as to optimize a MAC-hs PDU format. When a specific queue is allocated to a service such as VoIP, the base station may request the mobile terminal to inform a length of an SID of a MAC-hs PDU corresponding to the specific queue. Accordingly, the mobile terminal may be requested to re-arrange the received MAC-hs PDU in correspondence with the SID field. The SID may be set to have a length of 4 bits or 5 bits in the queue used in the VoIP.

This disclosure may propose not to use an N(Number) field so as to optimize a MAC-hs PDU format. That is, when a specific queue is used to a service such as VoIP, an N field is not used. In case of a service such as VoIP, one data may be generated in a specific time period. Since it is rarely situation that a plurality of data are included in one MAC-hs PDU for the VoIP service, the N field may not be used.

This disclosure may propose to inform a mobile terminal of the number of bits of a TSN by a base station so as to optimize a MAC-hs PDU format. That is, the base station may inform the number of bits of a TSN to be used in a corresponding queue with respect to each MAC-hs queue. For instance, if a specific queue is mapped onto a VoIP service, the current 7 bits may be wasted. More concretely, the VoIP service may generate one data packet per 20 ms, and a maximum transmission delay time for data of the VoIP may be approximately 100 ms. Accordingly, the TSN does not need to have bits more than 5. As such, it should be enough for the TSN to have only 3 bits, a TSN of 3 bits may be proposed in this disclosure. When the base station informs a length of a TSN used at each queue, the mobile terminal may re-arrange (re-configure, re-construct, re-build) a received MAC-hs PDU in correspondence with the length.

Also, if a network can always ensure an order of data of the VoIP, the TSN may be not required. Namely, when a length of a TSN used in a specific queue is '0', the mobile terminal may be requested to re-arrange a MAC-hs PDU mapped onto the specific queue thus to transport it to an upper layer upon receiving the MAC-hs PDU. This disclosure may propose to inform the mobile terminal of whether or not a re-ordering for each queue is necessary by the base station. If a specific queue is set not to be re-ordered, the mobile terminal may re-arrange the MAC-hs PDU thus to transmit it to an upper layer upon the MAC-hs PDU reaches the queue. Accordingly, this disclosure may propose to transmit a re-ordering required indicator to each queue by the base station.

In this disclosure, a queue ID (Queue identifier) may also be excluded so as to optimize a MAC-hs PDU format. That is, if a specific queue may be mapped onto a specific HARQ process by one to one, the queue ID may be estimated by the HARQ process. When a specific queue is mapped onto a specific process, the MAC-hs PDU may be requested not to include the queue ID at a header thereof. When a specific queue is mapped onto a specific HARQ process, the base station may inform the mapping to the mobile terminal and may request not to include the queue ID in a MAC-hs PDU transmitted through the specific queue. When the base station informs that the specific queue has been mapped onto the specific process, the mobile terminal may be requested to transmit a MAC-hs PDU received through the process to the specific queue. Furthermore, the base station may transmit information indicating which queue can be mapped onto the mobile station.

In this disclosure, when a logical channel (which mapped onto a specific queue) has data blocks of the same size, an SID may be not used in a MAC-hs PDU transmitted to the queue. More concretely, if the base station instructs only a MAC-hs SDU of a specific size to be used at a specific queue, the mobile terminal may suppose a specific MAC-hs SDU size for a MAC-hs PDU received to the specific queue and may execute or perform a decompression of the MAC-hs SDU.

FIG. 1 is an exemplary network structure showing a Universal Mobile Telecommunications System (UMTS).

As shown, the UMTS system may comprise a User Equipment (UE), a UTMS Terrestrial Radio Access Network (UTRAN), and a Core Network (CN). The UTRAN may consist of one or more Radio Network Sub-systems (RNS), and each RNS consists of one Radio Network Controller (RNC) and one or more Nodes B controlled by the RNC.

An exemplary architecture of the radio interface protocol is illustrated in FIG. 2. As shown, the radio protocols may exist between a mobile terminal and a UTRAN as pairs, and may transmit data on a radio interface. A first PHY (Physical) layer of the radio protocols may transmit data on a radio interface by using various radio transmission techniques. The PHY layer may be connected to an upper layer, a MAC (Medium Access Control) layer through a transport channel, and the transport channel may be classified into a dedicated transport channel and a common transport channel depending on whether the transport channel is shared.

The second layer may include a Medium Access Control (MAC) layer, a Radio Link Control (RLC) layer, a Packet Data Convergence Protocol (PDCP) layer, and a Broadcast/Multicast Control (BMC). The MAC layer may handle mapping between logical channels and transport channels, and may perform a multiplexing function to map several logical channels to one transport channel. The MAC layer may be connected to an upper layer, the RLC layer through a logical channel. The logical channel may be largely classified into a control channel for transmitting information of a control plane, and a traffic channel for transmitting information of a user plane according to the type of information transmitted. The MAC layer may be classified into a MAC-d sub-layer, a MAC-c/sh sub-layer, a MAC-hs sub-layer, and a MAC-e sub-layer. The MAC-b sub layer may manage a Broadcast Channel (BCH), a transport channel for broadcasting system information, and the MAC-c/sh sub-layer may manage a common transport channel such as a Forward Access Channel (FACH) or a Downlink Shared Channel (DSCH) shared by other mobile terminals. The MAC-d sub-layer may manage a Dedicated Channel (DCH) for a specific mobile terminal. The MAC-hs sub-layer may manage a High Speed Downlink Shared Channel (HS-DSCH), a transport channel for high speed downlink data. Also, the MAC-e sub-layer may manage an Enhanced Dedicated Channel (E-DCH), a transport channel for high speed uplink data. The exemplary structure of an UE and UTRAN side MAC sub-layer architecture may be specifically illustrated as shown in FIG. 3 and FIG. 4 respectively. FIG. 3 shows various channel mappings and functionalities of each MAC sub-layer within the UE side MAC layer, and FIG. 4 shows various channel mappings and functionalities of each MAC sub-layer within the UTRAN side MAC layer. Here, certain features that may be part of FIG. 3 and FIG. 4 will not be described in much detail, merely to prevent the characteristics of this disclosure from being obscured. However, such additional features may be incorporated in this disclosure as well, as it would be understood or obvious by those skilled in the art.

The RLC layer may ensure QoS (Quality of Service) of each Radio Bearer (RB) and data transmission according to the QoS. Namely, the RLC may be provided with one or two independent RLC entities in each RB so as to ensure the QoS of the RB, and the RLC may provide three RLC modes of a Transparent Mode (TM), an Unacknowledged Mode (UM), and an Acknowledged Mode (AM) so as to support various QoS. The RLC may control a data size so that a lower layer (entity) can transmit data and segments, and can connect data received from an upper layer.

The PDCP layer is located above the RLC layer. The PDCP layer is used to transmit data, such as the IPv4 or IPv6, effectively on a radio interface with a relatively small bandwidth. To this end, the PDCP layer performs a header compression function for transmitting only necessary information in a header of data thereby enhancing transmission efficiency on the radio interface. Since the PDCP layer has the header compression function as a main function, it may exist only at a Packet Service (PS) domain. One PDCP entity may exist at each RB so as to provide an effective header compression function for each PS service.

In a second layer, a Broadcast/Multicast Control (BMC) layer is located above the RLC layer. The BMC layer may schedule a cell broadcast message, and may broadcast the scheduled message to mobile terminals inside a specific cell.

A Radio Resource Control (RRC) layer, the lowest layer of a third layer may be defined only at a control plane, and may control parameters of the first and second layers with respect to configuring, re-configuring, and release of RBs. Also, the RRC layer may control a logical channel, a transport channel, and a physical channel. The RB may indicate a logical path provided by the first and second layers of the radio protocol for data transmission between the mobile terminal and the UTRAN. In general, the configuring of the RB refers to the process of stipulating the characteristics of a protocol layer and a channel required for providing a specific data service, and setting the respective detailed parameters and operation methods.

Hereinafter, the RLC layer relevant to the this disclosure will be explained in more detail.

The RLC layer may have a main function to ensure a Quality of Service (QoS) of each Radio Bearer (RB) and to data transmission according to the QoS. Since the RB service may be a service provided to an upper layer from a second layer of radio protocols, the second layer entirely may influence on the QoS. The RLC of the second layer may be the most influential on the QoS. The RLC may have an independent RLC entity at each RB so as to ensure the QoS of the RB, and may have three RLC modes of a Transparent Mode (TM), an Unacknowledged Mode (UM), and an Acknowledged Mode (AM) so as to support various QoS. Since the three modes of the RLC may have different supported QoS, each RLC modes may be differently operated and may have different functions from each other. Accordingly, the RLC will be explained according to each operation mode thereof.

Hereinafter, each operation mode of the RLC will be explained.

First, the TM RLC may be a mode for providing no overhead to an RLC SDU (Service Data Unit) received from an upper layer in configuration of an RLC PDU (Protocol Data Unit). That is, in the TM RLC mode, the SDU may be transparently passed and the following functions may be performed in a user plane and a control plane. In the user plane, the TM RLC may transmit real time circuit data such as voice or streaming in a Circuit Service (CS) domain due to a short data processing time in the RLC. However, in the control plane, due to no overhead in the RLC, the TM RLC may transmit an RRC message of a non-specific mobile terminal for an uplink, and may broadcast an RRC message to all mobile terminals in a cell for a downlink.

Second, the non-transparent mode may be a mode for providing an overhead to the RLC SDU. The non-transparent mode may include an unacknowledged mode (UM) having no acknowledgement for a received data, and an acknowledged mode (AM) having an acknowledgement for a received data.

The UM RLC may be a mode for providing a PDU header including a Sequence Number (SN) to each PDU, thereby enabling a receiving side to identify which PDU has been lost during transmission. Accordingly, in the user's plane, the UM RLC may serve to transmit broadcast/multicast data or real time pack data such as voice (e.g., VoIP) and streaming in a Packet Service (PS) domain. In the control plane, the UM RLC may serve to transmit an RRC message requiring no acknowledgement of reception among RRC messages transmitted to a specific mobile terminal in a cell or a specific mobile terminal group.

The AM RLC may be similar to the UM RLC in that a PDU is configured by adding a PDU header including an SN (Serial Number) to the PDU. However, the AM RLC may be different from the UM RLC in that a receiving side has to acknowledge a PDU transmitted from a transmitting side. The AM RLC may acknowledge a PDU so as to request the transmitting side to re-transmit a PDU having not been transmitted to the receiving side. The re-transmission function may be the most representative characteristic of the AM RLC. The AM RLC may serve to ensure error-free data transmission through the re-transmission. Accordingly, in the use's plane, the AM RLC may serve to transmit non-real time packet data such as TCP/IP in a PS domain. In the control plane, the AM RLC may serve to transmit an RRC message absolutely requiring an acknowledgement of reception among RRC messages transmitted to a specific mobile terminal in a cell.

The TM RLC and the UM RLC may be used in a uni-directional communications system, whereas the AM RLC may be used in a bi-directional communications system due to feedback from a receiving side. Since the bi-directional communication may be mainly used at a point-to-point communication, the AM RLC may use only a dedicated logical channel. The TM RLC and the non-transparent mode RLC may be also different from each other in a structural aspect. (i.e., the TM RLC and the UM RLC have a structure in which one RLC entity has a transmitting side or a receiving side, whereas the AM RLC has a structure in which one RLC entity has both a transmitting side and a receiving side).

The AM RLC may be complicated due to the re-transmission function. The AM RLC may be provided with a re-transmission buffer as well as a transmission buffer and a reception buffer, and may perform several functions such as using a transmitting and a receiving window for a flow control, a polling to request status information to a receiving side of a peer RLC entity by a transmitting side, a status report to report a buffer status of the receiving side to the transmitting side of the peer RLC entity by the receiving side, a status PDU to transmit status information, a Piggyback function to insert a status PDU in a data PDU so as to enhance a data transmission, etc. Additionally, there is a Reset PDU for requesting another AM RLC entity to reset all operations and parameters, and a Reset Ack PDU used to respond to the Reset PDU. In order to support the functions, the AM RLC may require several protocol parameters, status variables, and timers. The PDUs used to control data transmission in the AM RLC such as the Status Report, Status PDU, and the Reset PDU may be called as 'Control PDUs', and PDUs used to transmit user data may be called as 'Data PDUs'.

The PDUs used in the AM RLC may be largely classified into Data PDUs and Control PDUs. The Control PDU may consist of a Status PDU, a Piggybacked PDU, a Reset PDU, and a Reset Ack PDU.

Hereinafter, the RLC PDU used in the AM RLC entity will be explained.

As shown in FIG. 5, the 'D/C' may indicate whether the AM RLC PDU is a user data PDU or a control PDU. The 'sequence number' may denote a sequence number of each PDU. The 'P' may denote a polling bit, which may indicate whether or not a receiving side has to send a status PDU. The 'Length Indicator (LI) may indicate an border between SDUs in one PDU. The 'E' may denote an 'Extension bit', which may indicate whether or not the next Octet is a Length Indicator (LI). The 'HE' may denote a 'Header Extension Bit', which may indicate whether the next Octet is a Length Indicator or data. The 'Pad' may be a padding region, which may not used in the AM RLC PDU.

The AM RLC PDU may be used when the AM RLC entity is to transmit user data or piggybacked status information or polling bit. The user data may consist of an integer corresponding to times of 8 bits, and a header of the AM RLC PDU consists of a sequence number having 2 octets. The header of the AM RLC PDU may include a length indicator.

Referring to FIG. 6, a 'VF' (Version Flag) may indicate a version of a format of a used MAC-hs PDU, and a 'Queue ID' (Queue Identifier) may indicate to which MAC-hs queue the MAC-hs PDU correspond. A 'Transmission Sequence Number' (TSN) may be a sequence number used in one queue, and may be used to re-order MAC-hs PDUs received by the receiving side. An 'SID' (Size Index Identifier) may indicate a size of an included MAC-hs SDU, and an 'N' (Number) may indicate the number of the MAC-hs SDUs corresponding to the previous SID. An 'F' (Flag) may indicate whether fields of an SID and an N continuously exist in the head of the MAC-hs PDU. In FIG. 6, the 'VF' may be 1 bit, the 'Queue ID' may be 3 bits, the 'TSN' may be 6 bits, the 'SID' may be 3 bits, the 'N' may be 7 bits, and the 'F' may be 1 bit.

FIG. 7 shows an exemplary structure of a MAC-hs SDU.

Referring to FIG. 7, when a plurality of logical channels is mapped onto one MAC-hs queue, a C/T (Control/Traffic) field may be used. However, when one logical channel is mapped onto one MAC-hs queue, the C/T field may not be used. That is, when a plurality of logical channels is mapped onto one MAC-has queue, the C/T field may have a role to identify each logical channel. The MAC SDU may be equal to the RLC PDU. The MAC-hs SDU may be based on the RLC PDU transmitted from the RLC layer which is the upper layer of MAC, as a data block.

Hereinafter, the structure and operation of this disclosure will be explained.

FIG. 8 shows an exemplary structure a MAC-hs PDU according to one embodiment of this disclosure.

When compared with the MAC-hs PDU of FIG. 6, the MAC-hs PDU of FIG. 8 may have a structure that a queue ID, a TSN, and an SID are used. Under an assumption that one MAC-hs SDU is always included in the MAC-hs PDU, an N field may be removed. Accordingly, an F field may be removed.

FIG. 9 shows an exemplary structure a MAC-hs PDU according to another embodiment of this disclosure.

As shown in FIG. 9, an SID field may be excluded. If a base station informs a mobile terminal of a size of an MAC-hs PDU and a physical layer can identify the size of the MAC-hs PDU through a decoding, including an SID to the MAC-hs PDU in a transmitting side may be wasteful. Accordingly, if the physical layer can identify the size of the MAC-hs PDU and the size of the MAC-hs header through a decoding, the size of the MAC-hs SDU can be obtained. Herein, if a relation between a specific process and a MAC-hs queue may preset, a queue ID may be removed.

However, if one or more logical channels are established to a mobile terminal, data received from the logical channels may be included in one MAC-hs PDU. For the optimization, a field size of an MAC-hs header may be requested to be informed to each logical channel. In this disclosure, the size of each field of the MAC-hs header may be different from each other according to each mobile terminal, or each queue, or each logical channel.

In this disclosure, when each radio bearer is established, the base station may inform the mobile terminal of a field parameter of a MAC-hs header relating to each radio bearer or each logical channel. The parameter may inform whether or not each field of the MAC header exists, or size information of the MAC header field.

FIG. 10 shows an exemplary structure a MAC-hs PDU according to another embodiment of this disclosure. It is assumed that one mobile terminal simultaneously uses an Internet browsing and a VoIP. Accordingly, the Internet browsing data can be mapped onto a first logical channel, and the VoIP can be mapped onto a second logical channel. It is assumed that an SID of 5 bits, an N of 7 bits, and a TSN of 7 bits are used in the first logical channel in the MAC-hs header, and an SID of 8 bits, an N of 2 bits, and a TSN of 2 bits are used in the second logical channel in the MAC-hs header. The first logical channel is supposed to be mapped onto a queue 1, and the second logical channel is supposed to be mapped onto a queue 2, thereby implementing the MAC-hs PDU format of FIG. 10. If the 'SID' field and the 'N' field are not used in the MSC-hs PDU of FIG. 10, a structure of a MAC-hs PDU of FIG. 11 will be implemented.

As shown in FIG. 11, the MAC-hs PDU of FIG. 11 may be a format which does not use the SID and the N with respect to the queue 2 differently from the MAC-hs PDU of FIG. 10.

When establishing a call, a network may inform a mobile terminal of each field size of a MAC-hs according to each logical channel or each queue. Accordingly, a MAC-hs in the transmitting side may configure a header of the MAC-hs with each field size set by a logical channel or a queue when transmitting data of a specific logical channel or a queue. The size of the field of the MAC-hs header may be different from each other according to each logical channel or each queue. A MAC-hs receiving side may determine which data corresponding to the logical channel or the queue is included in the MAC-hs PDU by using the MAC-hs header. Then, the MAC-hs in the receiving side may identify the size of the field of the MAC-hs header set by each logical channel or each queue, and may extract each field of the MAC-hs header in correspondence with the size. Then, the MAC-hs in the receiving side may decode the MAC-hs header thereby to extract a MAC-hs SDU included in the MAC-hs PDU.

In this disclosure, when a C/T field is included in a MAC-hs PDU, the C/T field may be compressed by a MAC-hs entity so as to reduce an overhead due to a header of a MAC-hs PDU. Even if several logical channels are mapped onto one MAC-hs queue, if one MAC-hs PDU includes a MAC-hs entity transmitted from one logical channel, all the MAC-hs SDUs may have the same C/T field. Accordingly, the MAC-hs entity may be requested to compress the same C/T field and to transmit only one C/T field. A transmitting side MAC-hs entity may remove a C/T field included in each MAC-hs SDU, may include the MAC-hs SDUs having the removed C/T field into a MAC-hs PDU, and may include one C/T field into a header of the MAC-hs PDU. When one or more MAC-hs SDUs are included in the MAC-hs PDU, a MAC-hs in the receiving side may restore the C/T field included in the header thus to insert it to the respective MAC-hs SDUs included in the MAC-hs PDU. Accordingly, the MAC-hs SDU may be decompressed (decoded, re-converted, re-arranged) into the original state, and then may be transmitted to an upper layer.

If the respective MAC-hs SDUs have consecutive sequence numbers, the sequence numbers can be compressed. Under a state that the MAC-hs SDUs included in one MAC-hs PDU may have consecutive sequence numbers, the sequence numbers of other MAC-hs SDUs can be identified only if the sequence number of the first MAC-hs SDU is identified.

In this disclosure, when MAC-hs SDUs are consecutively included in one MAC-hs PDU, a sequence number of the first MAC-hs SDU may be included in a header of the MAC-hs PDU, and the rest sequence numbers of the MAC-hs SDU included in the MAC-hs PDU may be removed. Then, the MAC-hs SDUs having the removed sequence numbers may be included in the MAC-hs PDU thus to be transmitted. A receiving side may identify the sequence number of the first MAC-hs SDU by using a header of the received MAC-hs PDU, and may apply it to the first MAC-hs SDU. Then, the receiving side may sequentially increase the sequence numbers thus to apply them to the rest MAC-hs SDUs. Then, the decompressed MAC-hs SDUs may be transmitted to an upper layer with including the sequence numbers.

FIG. 12 shows an exemplary structure of a MAC-hs PDU having compressed sequence numbers.

As shown, the first RLC PDU may have a sequence number of one, and the rest RLC PDUs may have incremented sequence numbers respectively (i.e., increased by one from the one). The RLC PDU may be assigned a C/T value via a MAC-d entity thus to become a MAC-hs SDU. The MAC-hs entity may remove a sequence number and a C/T value from the respective MAC-hs SDUs, and may include the MAC-hs SDUs into a MAC-hs PDU. The removed C/T value and the sequence number of the first MAC-hs SDU may be included in a header of the MAC-hs PDU.

So far, the method for optimizing a format of the MAC-hs PDU was explained. Hereinafter, a method for operating an RLC entity and a MAC entity capable of supporting a large number of users with using less resources in one cell with respect to a data block transmission will be explained.

In case of a High Speed Downlink Packet Access (HSDPA) and a High Speed Uplink Packet Access (HSUPA), only one data block may be transmitted to one mobile terminal in one Transmission Time Interval (TTI). When data included in several logical channels is to be simultaneously transmitted, necessary information may be inserted into a header of a MAC-hs PDU or a MAC-e PDU so that the MAC-hs PDU and the MAC-e PDU may include the data included in several logical channels.

In the HSDPA or the HSUPA of this disclosure, a problem of the conventional AM RLC entity may be solved by supporting a large number of users in one cell with using less resources.

This disclosure may propose to generate RLC PDUs of different sizes in one time period by an RLC entity and to transmit them to a lower layer. That is, an RLC entity and a MAC entity may calculate a maximum amount of data that can be transmitted by them based on their allocated resources, and may calculate a size of the RLC PDUs that can transmit the data. When one or more RLC PDUs are generated, the respective RLC PDUs may have different sizes from each other so as to minimize a waste amount of radio resources.

More concretely, when setting RLC entities of a mobile terminal, an RRC entity may informs sizes of RLC PDUs that can be used by the respective RLC entities. Herein, the number of the sizes of the RLC PDUs may be one or more. When the RLC entity receives one or more sizes of the RLC PDUs, it can use all of them. That is, the RLC entity may determine an amount of data allocated thereto when transmitting data, may determine sizes of the RLC PDUs enough to completely use the amount of data, and may determine the number of RLC PDUs to be constituted in correspondence to the sizes. The RLC entity may configure the RLC PDU from the RLC SDU depending on the determination.

This disclosure may propose to generate RLC PDUs of different sizes in one time period by one RLC entity and to transmit them to another RLC entity. That is, one RLC entity may transmit RLC PDUs having different sizes to a lower layer in one time period, and the lower layer may transmit the RLC PDUs received from the one RLC entity to another RLC entity.

Herein, the RLC PDUs may include only user data, both user data and control information, or only control information.

For instance, the conventional RLC entity may be supposed to always generate RLC PDUs of 300 bits, and a lower entity, a MAC entity may be supposed to transmit 400 bits. Herein, the MAC entity can transmit only one data of 300 bits. However, if data blocks having different sizes can be simultaneously transmitted, the RLC entity can generate one data block of 300 bits and one data block of 100 bits thus to transmit them to the lower entity. Since the RLC entity can transmit 400 bits, a data transmission speed may be more enhanced or improved comparing to the conventional art. Furthermore, since all the physical resources that can be used by the RLC entity can used, radio resources may be not wasted thus to implement a maximum usage efficiency.

A transmission capability for a Control PDU may be enhanced as the RLC entity uses one or more sizes of the RLC PDU. For instance, even if the RLC PDU has a preset size of 300 bits, if data has a large size, the RLC entity can arrange (assemble) the data block of 300 bits by using the data. However, the control PDU may have information less than 300 bits according to whether or not a situation has occurred between a receiving side RLC entity and a transmitting side RLC entity. An amount of the control information exchanged between the RLC entities may be decreased due to the HSDPA and HSUPA. If the RLC PDU having a preset size is configured when transmitting the Control information, a padding bit has to be inserted into the RLC PDU thus to cause a resource waste. However, in this disclosure, since RLC PDUs having different sizes are transmitted, the Control PDU including the control information may be arranged to have a size corresponding to the amount of the control information in one TTI thus to be transmitted. Accordingly, the RLC PDU including the user data in one TTI may have a size different from that of the RLC PDU including the control information in one TTI, and they may be simultaneously transmitted to another side through a lower layer.

In conclusion, this disclosure may propose one AM RLC entity to use one or more sizes of RLC PDUs. That is, the RLC entity may configure the RLC PDUs having different sizes. One AM RLC entity selects a specific size of the RLC PDU from a plurality of sizes which are already set and configures the RLC PDU from the RLC SDU. If the RLC entity receives a plurality of size information of the RLC PDUs when the RLC entity is configured, the RLC entity configures the RLC PDU having a size from one of the plurality of size information of the RLC PDUs.

In this disclosure, the AM RLC entity may configure the AM RLC PDU having variable sizes. That is, the AM RLC PDU may be configured not to always have the same size but to have different sizes according to each situation. The AM RLC entity may serve to configure the RLC PDUs of various sizes. That is, the AM RLC PDU may have various sizes without a limitation.

When the AM RLC is not configured to use an RLC PDU of a specific size, it can use RLC PDUs of various sizes.

The RLC PDUs having different sizes may be transmitted within the same time period or different time periods.

The MAC entity may be connected to the RLC entity. Accordingly, when configuring a MAC-hs PDU or a MAC-e PDU, the MAC entity may be requested to receive RLC PDUs of different sizes and to include them into one MAC-hs PDU or one MAC-e PDU. One MAC-hs PDU or one MAC-e PDU can transmit RLC PDUs of different sizes to one channel. Herein, a header of the MAC-hs PDU or the MAC-e PDU has to include information for each size of the RLC PDUs.

The MAC entity may inform each RLC entity of each size of the RLC PDUs and the number of the RLC PDUs having the size in each TTI. The number of the size information of the RLC PDUs may be plural. The RLC may configure the RLC PDUs based on the size and the number of the RLC PDUs thus to transmit them to the MAC entity.

As aforementioned, in this disclosure, a format of a MAC-hs PDU may be optimized in an RLC entity, especially in a MAC-hs entity, and the RLC entity may configure RLC PDUs having different sizes, thereby supporting a large number of users with using less resources.

This disclosure may provide a method of processing data units in a mobile communications system, the method comprising: receiving a first data unit and a second data unit from an upper entity, wherein the first data unit includes a first header and a first payload and the second data unit includes a second header and a second payload; converting at least one header field of the first header and at least one header field of the second header into at least one header field of a third data unit, wherein the third data unit includes at least one converted header field, the first payload, and the second payload; and transferring the third data unit to a lower layer, wherein the first data unit and the second data unit are MAC-hs Service Data Units (SDUs), the third data unit is a MAC-hs Protocol Data Unit (PDU), the lower layer is a physical layer, each header field of the first, second, and third header is same type if each header field of the first, second and third header is received via a single channel, each header field of first, second, and third header includes at least one of a C/T (Control/Traffic) field and a SN(Sequence Number) field, the converted header field of the third data unit is equal to at least one of header fields of the first header and the second header, and the converted header field of the third data unit is not equal to both header fields of the first header and the second header.

It can be also said that this disclosure may provide a method of processing data units in a mobile communications system, the method comprising: receiving a first data unit including a first header and a first payload from a lower layer; wherein a second payload of a second data unit and a third payload of a third data unit are included in the received first payload; converting at least one header field of the first header into at least one header field of each header of the second data unit and the third data unit thereby generating a second header and a third header; and transferring the second data unit and the third data unit to an upper layer, wherein the second data unit includes the second payload and the second header, and the third data unit includes the third payload and the third header, wherein the first data unit is a MAC-hs Protocol Data Unit (PDU), the second data unit and the third data unit are MAC-hs Service Data Units (SDUs), the lower layer is a physical layer, each header field of first, second, and third header includes at least one of a C/T (Control/Traffic) field and a SN(Sequence Number) field, the header field of the first data unit is equal to at least one of header fields of the second header and the third header, and the header field of the first data unit is not equal to both header fields of the second header and the third header.

Although this disclosure is described in the context of mobile communications, this disclosure may also be used in any wireless communication systems using mobile devices, such as PDAs and laptop computers equipped with wireless communication capabilities (i.e. interface). Moreover, the use of certain terms to describe this disclosure is not intended to limit the scope of this disclosure to a certain type of wireless communication system. This disclosure is also applicable to other wireless communication systems using different air interfaces and/or physical layers, for example, TDMA, CDMA, FDMA, WCDMA, OFDM, EV-DO, Wi-Max, Wi-Bro, GSM, GPRS, EDGE, EGPRS, LTE, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of this disclosure, and that the article of manufacture may comprise any information bearing medium known in the art.

As this disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of processing data units in a mobile communications system, the method comprising:
  receiving, from an upper entity, a first data unit including a first header and a first payload, and a second data unit including a second header and a second payload;
  converting a header field of the first header and a header field of the second header into a header field of a third header of a third data unit including the first payload and the second payload;
  determining a format of the third data unit by an upper entity signaling; and
  transferring the third data unit to a lower layer,
  wherein the header field of the first header and the header field of the second header are not fixed in size,
  wherein the first data unit and the second data unit are Medium Access Control-high speed Service Data Units (MAC-hs SDUs) and the third data unit is a MAC-hs Protocol Data Unit (PDU),
  wherein the third data unit corresponds to a queue used for a Voice over Internet Protocol (VoIP) service,
  wherein a Size Index Identifier (SID) field of the third data unit is set to have a length of 4 bits or 5 bits in the queue used for the VoIP service,
  wherein a queue identifier (queue ID) and a Number (N) field are not included in the third data unit, and
  wherein a number of bits of a Transmission Sequence Number (TSN) of the third data unit is set to have a length of less than 5 bits.

2. The method of claim 1, wherein the lower layer is a physical layer.

3. The method of claim 1, wherein the first header, second header, and third header have a same type of header field when each header field of the first header, second header, and third header is received via a single channel.

4. The method of claim 1, wherein each header field of the first header, second header, and third header includes at least a Control/Traffic (C/T) field or a Sequence Number (SN) field.

5. The method of claim 1, wherein the header field of the third header is equal to the header field of the first header and the header field of the second header.

6. The method of claim 1, wherein the header field of the third header is not equal to the header field of the first header and the header field of the second header.

7. A method of processing data units in a mobile communications system, the method comprising:
  receiving, from a lower layer, a first data unit including a first header and a first payload including a second payload of a second data unit and a third payload of a third data unit;
  converting a header field of the first header into a header field of a second header of the second data unit and a header field of a third header of the third data unit; and
  transferring the second data unit and the third data unit to an upper layer,
  wherein an upper entity signaling of a transmitting side determines a format of the first data unit, and
  wherein the header field of the second header and the header field of the third header are not fixed in size,
  wherein the first data unit is a Medium Access Control-high speed Protocol Data Unit (MAC-hs PDU), and the second data unit and the third data unit are MAC-hs Service Data Units (SDUs),
  wherein the first data unit corresponds to a queue used for a Voice over Internet Protocol (VoIP) service,
  wherein a Size Index Identifier (SID) field of the first data unit is set to have a length of 4 bits or 5 bits in the queue used for the VoIP service,
  wherein a queue identifier (queue ID) and a Number (N) field are not included in the first data unit, and
  wherein a number of bits of a Transmission Sequence Number (TSN) of the first data unit is set to have a length of less than 5 bits.

8. The method of claim 7, wherein the lower layer is a physical layer.

9. The method of claim 7, wherein each header field of the first header, second header, and third header includes at least a Control/Traffic (C/T) field or a Sequence Number (SN) field.

10. The method of claim 7, wherein the header field of the first header is equal to the header field of the second header and the header field of the third header.

11. The method of claim 7, wherein the header field of the first header is not equal to the header field of the second header and the header field of the third header.

* * * * *